No. 684,717. Patented Oct. 15, 1901.
J. T. PRICE & D. T. SHARPLES.
LIQUID HEATER OR COOLER.
(Application filed Mar. 31, 1900.)

(No Model.) 2 Sheets—Sheet 1.

Witnesses:
Frank L. A. Graham.
Louis M. F. Whitehead.

Inventors
Joseph T. Price.
David T. Sharples.
by their Attorneys:—
Howson & Howson No. 684,717. Patented Oct. 15, 1901.
J. T. PRICE & D. T. SHARPLES.
LIQUID HEATER OR COOLER.
(Application filed Mar. 31, 1900.)
(No Model.) 2 Sheets—Sheet 2.

Witnesses:—

Inventors:
Joseph T. Price.
David T. Sharples.
by their Attorneys:—

UNITED STATES PATENT OFFICE.

JOSEPH T. PRICE AND DAVID T. SHARPLES, OF WESTCHESTER, PENNSYLVANIA, ASSIGNORS TO SAID JOSEPH T. PRICE, OF SAME PLACE.

LIQUID HEATER OR COOLER.

SPECIFICATION forming part of Letters Patent No. 684,717, dated October 15, 1901.

Application filed March 31, 1900. Serial No. 11,010. (No model.)

*To all whom it may concern:*

Be it known that we, JOSEPH T. PRICE and DAVID T. SHARPLES, citizens of the United States, and residents of Westchester, Pennsylvania, have invented certain Improvements in Liquid Heaters or Coolers, of which the following is a specification.

The object of our invention is to construct a simple and effective device for heating or cooling liquids.

Our invention is especially adapted for heating milk to the proper temperature for use in a separator.

Figure 1:
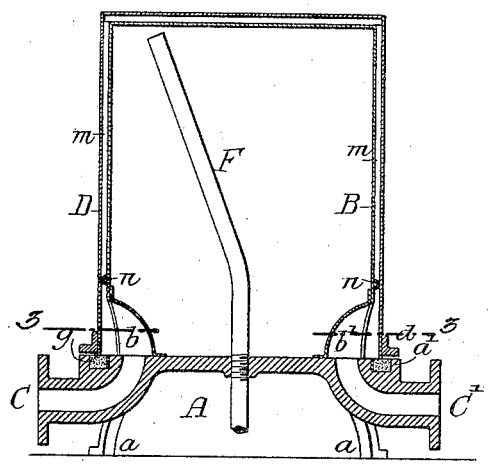
Figure 2:
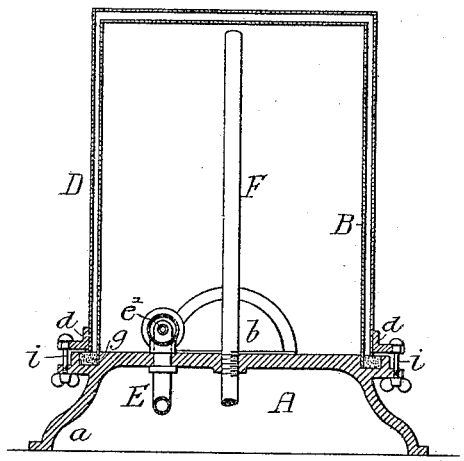
Figure 3:
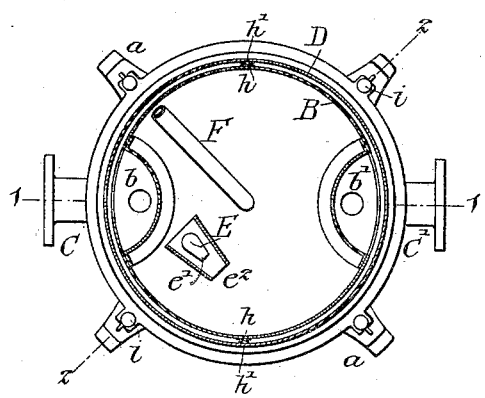
Figure 4:
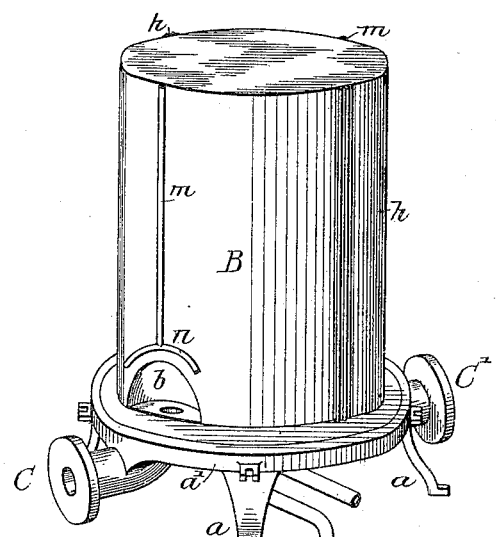
Figure 5:
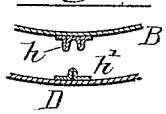
Figure 6:
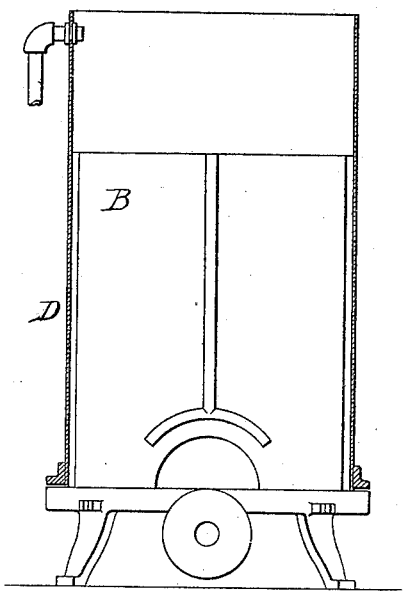
Figure 7:
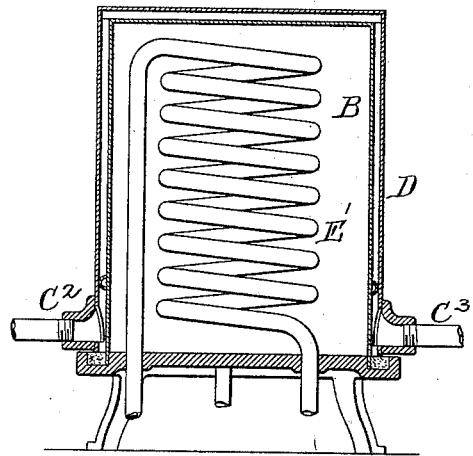
Figure 8:
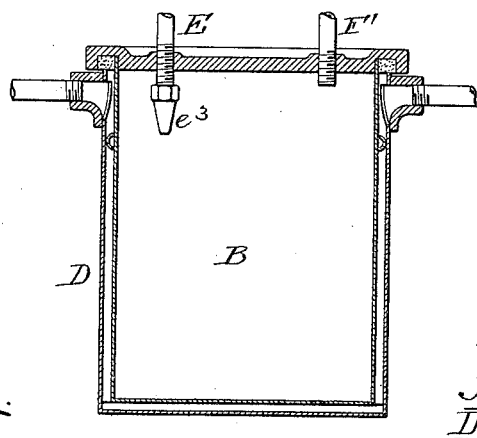

In the accompanying drawings, Figure 1 is a vertical sectional view of our improved apparatus on the line 1 1, Fig. 3. Fig. 2 is a section on the line 2 2, Fig. 3. Fig. 3 is a sectional plan view on the line 3 3, Fig. 1. Fig. 4 is a perspective view of the inner casing and base. Fig. 5 is a view showing the method of forming the deflector. Fig. 6 is a view showing our apparatus with the outer casing open at the top, and Figs. 7 and 8 are sectional views of modified forms of the apparatus.

A is the base of the apparatus, consisting in the present instance of a casting having feet $a$, and cast in the base in the present instance are the inlet and outlet passages C C', one on each side of the apparatus. In the base A is an annular groove $a'$, and secured to the inner wall of this groove is the casing B, made, preferably, of copper. This casing is recessed at $b$ $b'$ on opposite sides and directly above the inlet and outlet openings C C'. The recesses are made in the present instance by cutting out the walls of the casing and soldering curved sections to the casing and to the base. The chamber inclosed within the casing is thus made water and steam tight.

E is a steam-inlet pipe having a suitable valve $e$. The steam-pipe extends into the chamber within the casing B and has a nozzle $e'$ turned at right angles and inclosed within a tubular casing $e^2$, so that the steam will give motion to the body of water within the chamber.

F is an outlet-pipe extending up to one corner of the chamber, so that the overflow of water due to the condensation of the steam will pass to waste. We place the outlet at one corner, so that the device can be mounted either as shown in the drawings or secured with the base against the wall or other vertical support.

Surrounding the casing B is a second casing D, which rests upon a packing $g$ within the annular recess $a'$. The outer casing D is a trifle larger than the inner casing, so that there will be a narrow space for the passage of the milk or other fluid to be heated or cooled. The casing has a flange $d$ at the base, and on the flange are slotted projections adapted to receive bolts $i$, by which the outer casing is clamped to the base. The casing has a bearing-surface at its lower side, which rests directly upon the packing, which is preferably made of cork, so that a tight fit is insured. The milk or other liquid flows into the space between the two chambers through the inlet-passage C, and in order to insure the thorough heating or cooling of the fluid we place barriers in the passage at each side, as shown by the plan views, Figs. 3 and 5. A grooved plate $h$ is secured to the inner casing in the present instance, and a tongued plate $h'$ is secured to the outer casing, so that when the outer casing is placed over the inner casing these tongues enter the grooves, and thus insure a neat fit. The fluid in its passage will flow in at the base, up one side, over the top of the inner casing, and down over the sides to the outlet-passage C'. Thus the fluid is heated or cooled evenly throughout. In heating by increasing or diminishing the amount of steam entering the chamber any desired degree of heat may be attained. In order to keep the two casings the proper distance apart, we form on the inner casing vertical ribs or secure short pieces of wire $m$ thereto, and in order to distribute the fluid more evenly we place a barrier $n$ above the inlet-opening and also above the outlet-opening, as clearly shown in Fig. 4.

It will be understood that while our invention is especially adapted for the purpose of heating milk to the proper temperature it may be used for heating other liquids where it is desired that they should have a given temperature, and it may be used also for the purpose of cooling liquids by allowing cold water to flow into the inner chamber instead of steam.

In some instances we may dispense with the top of the outer casing, as shown in Fig. 6, and extend the casing considerably above the upper portion of the inner casing and leave it open at the top. In a device of this kind the fluid can be pumped into the casing, and it will simply rise or fall, according to the amount of liquid pumped; but the outflow will be comparatively even. This is desirable where a too-large or uneven inflow comes to the heater and where the flow from the heater should be uniform.

In Fig. 7 we have shown a modification of the device, in which a steam-coil E' is used to heat the liquid within the inner casing B, and instead of forming the outlet-passages in the base and recessing the inner casing we have shown the outlet-passages $C^2$ $C^3$ connected to the outer casing D.

In Fig. 8 we have shown the device inverted and instead of the steam-coil shown in Fig. 7 simply use a plain nozzle $e^3$ on the end of the steam-pipe E, and the overflow-pipe $f'$ is connected to the top of the apparatus. The apparatus can be mounted as shown in Fig. 1, or inverted, as shown in Fig. 8, or placed in any position, according to the use for which it is intended.

It will be seen by the above description that a large body of water can be used for heating or cooling in order to preserve an even temperature in the cooler and that a perfect circulation of the fluid to be heated or cooled is gained by the construction shown and that the material to be cooled is between the water and the atmosphere, and consequently a more even temperature of the water is maintained, and by circulating the liquid to be heated or cooled over the inner chamber the temperature of the material can be readily ascertained by hand at any point of the casing. Furthermore, by the construction shown in Figs. 1 to 4, all the pipes are coupled to the stationary part of the apparatus, so that all that is necessary in cleansing is to remove the outer casing without detaching any of the pipes.

We have alluded in the specification and claims to the portion A as the "base;" but it will be understood that it may be simply a flanged plate, as in Fig. 8, and the device may be used either as shown in Figs. 1, 6, and 7 or inverted, as shown in Fig. 8.

We claim as our invention—

1. In an apparatus for heating or cooling fluids, the combination of a closed inner casing, an outer casing also closed, having its external surface exposed to the atmosphere and forming with the said inner casing, a passage not communicating with the inner casing for the liquid to be heated or cooled, an inlet and outlet for said passage, the said inner casing being constructed to contain a fluid for varying the temperature thereof and having an inlet and outlet whereby said fluid may be admitted and drawn off, substantially as described.

2. The combination of a closed inner casing, an outer casing also closed surrounding the same and forming with it a passage for the liquid to be heated or cooled, said passage having an inlet and an outlet and not communicating with the interior of the inner casing, an inlet and outlet for the inner casing and means for heating or cooling the same, and partitions between the casings constructed to cause circulation of the liquid to be heated or cooled while said liquid is flowing from the inlet to the outlet, substantially as described.

3. The combination of the base, an inner casing secured to the base, inlet and outlet recesses at each side, inlet and outlet passages communicating with the said recessed portion of the casing, and an outer casing forming with the inner casing a passage for the liquid to be heated, substantially as described.

4. The combination of the base, an inner casing secured to the base, an outer casing, means for securing the outer casing to the base, packing between the outer casing and the base, inlet and outlet passages leading to the space between the casings, an overflow-pipe opening into the inner chamber, and an inlet-pipe also within the chamber, substantially as and for the purpose set forth.

In testimony whereof we have signed our names to this specification in the presence of two subscribing witnesses.

JOSEPH T. PRICE.
DAVID T. SHARPLES.

Witnesses:
JOS. T. MURTAGH,
ALAWILDA HAINES.